F. J. CLEAVER.
MEANS FOR LOCKING JOINTS.
APPLICATION FILED APR. 9, 1915.
1,163,218.
Patented Dec. 7, 1915.
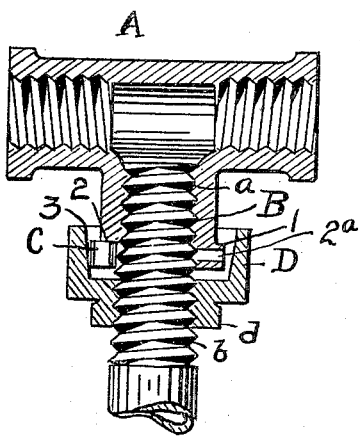
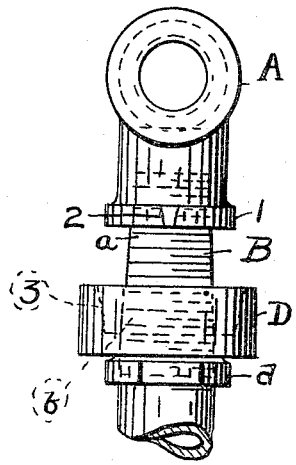
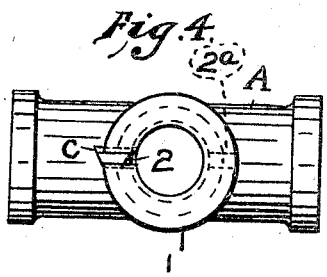
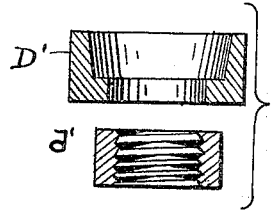
WITNESS
INVENTOR

UNITED STATES PATENT OFFICE.

FREMONT J. CLEAVER, OF CARNEGIE BOROUGH, PENNSYLVANIA, ASSIGNOR OF ONE-FOURTH TO SAMUEL L. H. MORRIS, ONE-FOURTH TO HERBERT W. HODGDON, AND ONE-FOURTH TO EDWIN T. BARON, ALL OF PITTSBURGH, PENNSYLVANIA.

MEANS FOR LOCKING JOINTS.

1,163,218.  Specification of Letters Patent.  Patented Dec. 7, 1915.

Application filed April 9, 1915. Serial No. 20,144.

*To all whom it may concern:*

Be it known that I, FREMONT J. CLEAVER, a citizen of the United States, and residing in the borough of Carnegie, in the county of Allegheny and State of Pennsylvania, have invented or discovered new and useful Improvements in Means for Locking Joints, of which the following is a specification.

My invention consists of new and improved means for locking pipe joints.

Fixtures or other attachments, such as chandeliers, water-faucets, &c., are connected to the service pipes by means of nipples which latter are secured to both the service pipes and the fixture by threaded engagement. Therefore the removal or unscrewing of the fixture frequently results in loosening or partially unscrewing the joint or union between the service pipe and the nipple, resulting in a concealed and highly dangerous leak.

The object of my invention is the prevention of such leaks and I accomplish the same by locking the union between the service pipe and the nipple to prevent loosening. For this purpose I provide a locking member which engages both the service pipe element and the nipple and a clamp collar mounted on the nipple and holding said locking member tightly in place.

In the accompanying drawings, Figure 1 shows in vertical section a nipple locked by means of my invention to a T of a service pipe; Fig. 2 is an end view of the same joint unlocked, the interior parts being indicated in dotted lines; Fig. 3 is a perspective showing a plurality of locking keys as they are stamped out of bar-steel and connected together by a thin easily detached fin of metal; Fig. 4 is a bottom plan view of the T shown in Figs. 1 and 2; Fig. 5 is a side elevation of a modified form of locking key, and Fig. 6 is a vertical section showing a modified form of clamp collar.

The following is a detailed description of my invention.

A is a connection, such as the T shown, in the service pipe, not shown, and B is the nipple or pipe end to be screwed into and locked into engagement with the same, the fixture being attached to the lower or free end of said nipple. The end of said nipple is provided with a tapered thread $a$ followed by a thread $b$ of constant diameter. The tapered thread $a$ is screwed as far as it will go into the threaded T. The bottom flange 1 of the T is provided with a transverse or radial seat 2, preferably downwardly tapered, as shown in Fig. 2. C is a key of suitable cross section to be slipped into the said seat endwise. The ends of said key C are beveled and sharpened, as shown so that the inner end of said key will tend to engage and dig into the nipple when an attempt is made to unscrew the latter and the outer end of said key will similarly dig into the clamp collar, next to be described.

D is the clamp collar screwed on the threads $b$ of the nipple B and having its lower portion $d$ squared for the application of a wrench or spanner to adjust the collar. The upper body of clamp collar D is countersunk forming a seat provided with an inwardly tapered annular wall 3. When the nipple B is screwed up snugly in the T A and the key C is in place in the seat 2, the collar D is screwed up as shown in Fig. 1, the incline wall 3 of the collar engaging the outer end of the key C and forcing the inner end of said key into tight engagement with the nipple B. Thus the key C will engage the T A and be jammed into end engagement with the nipple and the collar. The sharpened outer end of the key C will dig into and lock the collar D from unscrewing and the sharp inner end of the key will act the same with the nipple B. Thus both collar and nipple are locked rigidly together and to the flange 1 of the T A. It is evident that no accidental loosening of the joint will occur through the removal of fixtures or attachments from the nipple.

The keys C may be stamped out in quantities from suitable bar-steel, the individuals being preferably left connected by a thin web of material which the plumber or gas fitter can readily detach when he is to use a key.

In Figs. 1 and 4 a radial hole or bore $2^a$ is shown provided in the flange 1 of the T A and in Fig. 5 a key C′ in the form of a round pin with beveled ends is shown which may be inserted in said bore $2^a$ as a substitute for the key C. The action of the pin key is the same as that of the key C.

In Fig. 6 I have shown a modified form of clamp collar wherein the recessed collar D' is made separate from the base or nut d'. Here the bore of the collar D' is unthreaded and slips easily along the nipple B while the nut d' engages the thread b. Thus the travel of the nut d' toward the end of the nipple B will force the collar D' upwardly and drive the inner sharpened end of the key C into the nipple B, thus locking the T A and the nipple B tightly together. When it is desired to loosen the connection, the nut d' is retreated down the nipple and the collar D' driven by means of a hammer along the nipple after the nut. The key C' will thus be loosened and can be removed, thereby unlocking the joint between the service pipe and the nipple. The ends of the key C being beveled, as shown, while locking the parts against unscrewing, will not interfere seriously with screwing up the parts as the sharpened key end will trail as the parts are screwed together.

It is thus evident that my invention renders the accidental loosening of the joint impossible while adding but little to the expense.

What I desire to claim is:—

1. A locking joint comprising an externally threaded member, an internally threaded member adapted to be screwed onto said first member and provided with a radial key seat through its wall, a key having both ends sharpened mounted in said seat and having its inner end engaging said first member, and a clamping collar screwed up on said first member and having an axial recess with inwardly tapering wall to encompass said second member and wedge said key against said first member, substantially as described.

2. A locked joint comprising an externally threaded member having an untapered threaded portion and an outer tapered threaded portion, an internally threaded member screwed onto the tapered threaded portion of said first member and provided with a radial key seat through its wall, a key mounted in said seat, and a clamping collar screwed up on the untapered threaded portion of said first member and having an axial recess with inwardly tapering wall to encompass said second member and wedge said key against said first member, substantially as described.

Signed at Pittsburgh, Pa., this 6th day of April, 1915.

FREMONT J. CLEAVER.

Witnesses:
 JOHN McKELVIE,
 E. A. LAWRENCE.

Copies of this patent may be obtained for five cents each, by addressing the "Commissioner of Patents, Washington, D. C."